United States Patent [19]
Mita et al.

[11] Patent Number: 5,321,518
[45] Date of Patent: Jun. 14, 1994

[54] VIDEO SIGNAL RECORDING AND REPRODUCING APPARATUS USING AN ADDED SPECIFIC SIGNAL DURING RECORDING

[75] Inventors: Hideaki Mita, Kobe; Atsuo Ochi, Moriguchi; Yasuo Hamamoto, Neyagawa, all of Japan

[73] Assignee: Matsushita Electric Industrial Co., Ltd., Osaka, Japan

[21] Appl. No.: 893,009

[22] Filed: Jun. 3, 1992

[51] Int. Cl.⁵ .............................................. H04N 9/79
[52] U.S. Cl. .................... 358/327; 358/323; 358/320; 348/571
[58] Field of Search ............... 358/327, 310, 320, 323, 358/335, 330, 318, 21 R, 160; 360/23, 33.1; H04N 9/79, 9/80

[56] References Cited
U.S. PATENT DOCUMENTS

| | | | |
|---|---|---|---|
| 4,587,576 | 5/1986 | Hirota et al. | 358/335 |
| 4,630,131 | 12/1986 | Ichinoi et al. | 358/310 |
| 4,851,928 | 7/1989 | Numakura et al. | 358/310 |
| 5,132,807 | 7/1992 | Takimoto et al. | 358/335 |

FOREIGN PATENT DOCUMENTS 3325069 1/1985 Fed. Rep. of Germany.

*Primary Examiner*—Jeffery Brier
*Assistant Examiner*—Khoi Truong
*Attorney, Agent, or Firm*—Wenderoth, Lind & Ponack

[57] ABSTRACT

In a video signal recording/reproducing apparatus for emphasizing an input video signal, recording by adding an additional signal necessary for recording, and de-emphasizing when reproducing, the emphasis processing is stopped on the time axis in a period in which the additional signal is to be added. Besides, by adding an additional signal before emphasis processing, the waveform deterioration in the end portion of the effective period occurring due to the addition of additional signal after emphasis processing is decreased, and a favorable waveform reproduction is realized over the entire period of the effective portions.

2 Claims, 6 Drawing Sheets

VIDEO SIGNAL RECORDING AND REPRODUCING APPARATUS USING AN ADDED SPECIFIC SIGNAL DURING RECORDING

BACKGROUND OF THE INVENTION

1. Field of the Invention

The present invention relates to a video signal recording and reproducing apparatus for recording a video signal after adding thereto a specific signal necessary for recording the video signal on a recording medium.

2. Description of the Prior Art

In a video tape recorder or the like for recording and reproducing video signals, in order to alleviate the so-called triangular noise characteristic of FM transmission line noise in a frequency modulation and demodulation system, the signal level is raised in the medium and high frequency regions in the recording system by an emphasis processing, and lowered in the medium and high frequency regions in the reproducing system by de-emphasis processing.

Recently, moreover, in order to record a wideband video signal, a time axis compression multiplexing and multi-channel recording of the luminance signal and chrominance signal is employed. In this recording, generally, only an effective period containing a luminance signal (Y) and a chrominance signal (C) of an input video signal is taken out, and added to a specific signal which is necessary for recording the video signal, such as a synchronous signal and a Y/C guard signal.

FIG. 5 shows a conventional processing circuit. FIG. 6 is a waveform diagram showing signals at some portions in FIG. 5. In this example, the emphasis is a phase linear emphasis, but it may be a phase nonlinear emphasis.

In FIG. 5, element 1 is a luminance signal input terminal element 2 is a chrominance signal input terminal element 3 is a time-division multiplex (TDM) encoding circuit for time-compressing and multiplexing the luminance signal and chrominance signal to obtain a TDM signal; element 21 is an emphasis circuit; element 6 is a signal addition circuit for adding a specific signal necessary for recording; element 7 is a recording processing circuit for converting the TDM signal into a recordable signal suited to recording; element 8a is a recording head, for recording the recordable signal on a magnetic tape 9; element 8b is a reproducing head for reproducing the recorded signal from the magnetic tape 9; element 10 is a reproduction processing circuit for processing a reproduced signal from the head 8b to obtain the TDM signal; element 22 is a de-emphasis circuit; element 13 is a TDM decoding circuit for separating the TDM signal from the de-emphasis circuit 22 into the luminance signal and chrominance signal; element 14 is a synchronous signal addition circuit for adding a synchronous signal to the reproduced video signal (each of the luminance and chrominance signal); element 15 is a luminance signal output terminal, and; element 16 is a chrominance signal output terminal.

When recording, luminance and chrominance signals of a colorless and black level video signal, for example, as shown in waveform diagrams a and b in FIG. 6 are fed to the luminance signal input terminal 1 and chrominance signal input terminal 2, respectively. Here, t4 is the effective period of the luminance signal, and t2 is the effective period of the chrominance signal. The luminance signal and chrominance signal are compressed and multiplexed on the time axis in the TDM encoding circuit 3 to become a TDM signal as shown in c in FIG. 6. Here t1 is the synchronous signal period, t2 is the effective period of the chrominance signal, t3 is the Y/C guard period, and t4 is the effective period of the luminance signal. Usually black level signals are inserted in t1 and t3. The TDM signal becomes a waveform increased in the medium and high frequency regions as shown in d in FIG. 6 after passing through the emphasis circuit 21. In the recording signal addition circuit 6, the TDM signal is added to a synchronous signal in t1 and a Y/C guard signal in t3 to be the waveform as shown in e in FIG. 6. This signal is converted into a recordable signal suited to recording in the recording processing circuit 7, and then recorded on the magnetic tape 9 by the recording head 8a.

When reproducing, the signal reproduced by the reproducing head 8b is converted into the TDM signal by the reproduction processing circuit 10. The reproduced TDM signal is entered in the de-emphasis circuit 22, and decreased in level in the medium and high frequency regions decreased as shown in waveform f in FIG. 6. In the TDM decoding circuit 13, from the TDM signal f in FIG. 6, the signals in the effective period t4 of the luminance signal and the effective period t2 of the chrominance signal are separated, and expanded on the time axis. Then after adding a synchronous signal to each of the reparated luminance and chrominance signals in the synchronous signal addition circuit 14, the luminance signal g shown in FIG. 6 is ourputted from the luminance signal output terminal 15, and the chrominance signal h shown in FIG. 6 is outputted from the chrominance signal output terminal 16.

During recording, the specific signals necessary for recording, i.e., the synchronous signal and Y/C guard signal, are added to the signals in the periods t1 and t3 in FIG. 6d which contain the impulse responses due to emphasis processing of the chrominance signal and luminance signal in the effective periods t2 and 4t. When reproducing, the de-emphasis processing is done while the synchronous signal and Y/C guard signal are being added. Accordingly, there is a problem in that the waveform as in FIG. 6h has a deteriorated end portion of the effective period t2 of the chrominance signal. It may be considered advisable to insert a colorless signal level into the synchronous signal period t1 and Y/C guard signal period t3 of the signal in FIG. 6c before the emphasis processing in during recording, but in such a case the waveform deteriorates in the end portion of the effective period t4 of the luminance signal.

SUMMARY OF THE INVENTION

Thus, in the conventional arrangement, since the impulse responses just before and after the effective period occurring due to emphasis processing are eliminated, even if the de-emphasis is carried out, the waveform of the reproduced video signal has a deteriorated in the end portion of the effective period of the video signal.

It is hence a primary object of the invention to present a video signal recording and reproducing apparatus capable of performing a favorable waveform reproduction over the entire period of the effective portion of video signal by solving the above problems.

In an aspect of the present invention, a video signal recording and reproducing apparatus comprise: an emphasis means for emphasizing an input video signal to obtain a emphasized video signal, said emphasis means comprising an emphasis digital filter for performing an emphasis processing operation; a first detecting means for detecting an effective period of the input video signal, and for controlling said emphasis digital filter so as to stop the emphasis processing operation during a period other then the effective period; a signal adding means for adding a specific signal necessary for recording the video signal to the emphasized video signal in the period other than the effective period to obtain a recordable video signal; a recording and reproducing means for recording the recordable video signal on a recording medium and for reproducing the recorded video signal from the recording medium to obtain a reproduced emphasized video signal; a de-emphasis means for de-emphasizing the reproduced emphasized video signal to obtain a reproduced video signal, said de-emphasis means comprising a de-emphasis digital filter for performing a de-emphasis processing operation; and a second detecting means for detecting an effective period of the reproduced emphasized video signal, and for controlling said de-emphasis digital filter so as to stop the de-emphasis processing operation during a period other than the effective period. Since the period other than the effective period is not subjected to the emphasis processing and de-emphasis processing, no impulse response caused by the emphasis or de-emphasis processing occurs in the period other than the effective period. Accordingly, the signals in the effective period will not be deteriorated at an end portion of the effective period due to an influence of an impulse response contained in the period other than the effective period.

In another aspect of the present invention, a video signal recording and reproducing apparatus comprises: a first signal adding means for adding a first specific signal in a predetermined period of an input video signal; an emphasis means for emphasizing an output video signal from said first signal adding means to obtain an emphasized video signal; a second signal adding means for adding a second specific signal necessary for recording the video signal to the emphasized video signal in said predetermined period to obtain a recordable video signal; a recording and reproducing means for recording the recordable video signal on a recording medium and for reproducing the recorded video signal from the recording medium to obtain a reproduced emphasized video signal; and a de-emphasis means for de-emphasizing the reproduced emphasized video signal to obtain a reproduced video signal. The first specific signal added before the emphasis processing may be determined so as to minimize a deterioration of the signals in the effective period which would be caused due to the addition of the second specific signal and the de-emphasis processing. Accordingly, the video signal obtained after the de-emphasis processing during reproduction can have a favorable waveform free from undesirable deterioration.

DESCRIPTION OF THE PREFERRED EMBODIMENTS

Figure 1:
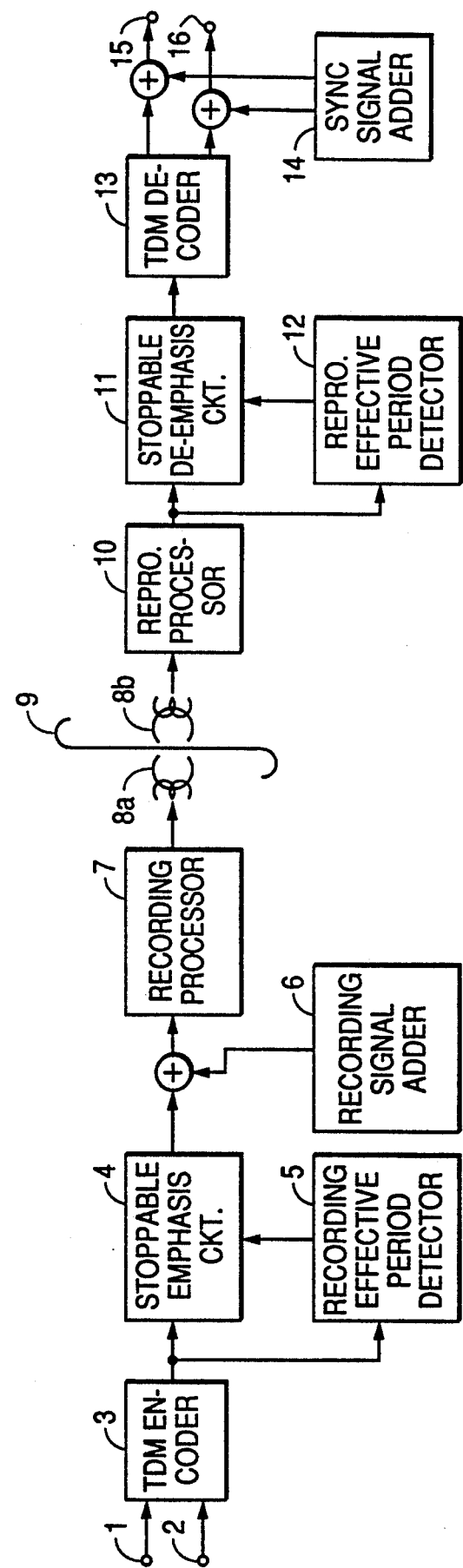
FIG. 1 is a block diagram showing a video signal recording and reproducing apparatus in accordance with a first embodiment of the present invention.
Figure 2:
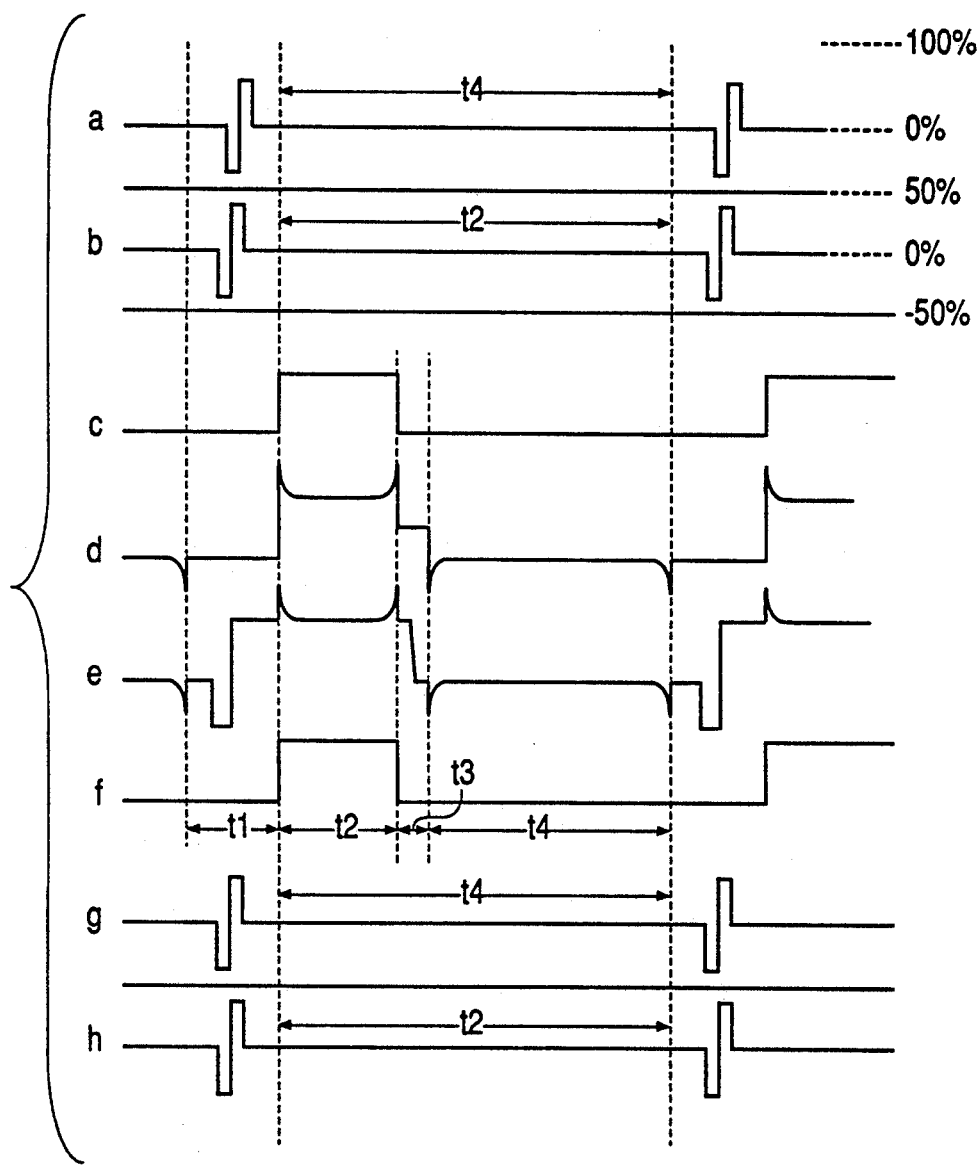
FIGS. 2a-2h are waveform diagram for explaining an operation of the first embodiment.

FIG. 1 is a block diagram of a video signal recording and reproducing apparatus in accordance with the first embodiment of the present invention. FIG. 2 is a waveform diagram showing signal waveforms in the video signal recording/reproducing apparatus of video signals in FIG. 1. In FIG. 1; element 1 is a luminance signal input terminal; element 2 is a chrominance signal input terminal; element 3 is a TDM encoding circuit for compressing and multiplexing the luminance signal and chrominance signal on the time axis to obtain a TDM signal; element 4 is an emphasis circuit composed of a digital filter capable of stopping its emphasis processing operation on the time axis; element 5 is an effective period detecting circuit for detecting an effective period of the TDM signal to be recorded; element 6 is a signal addition circuit for adding a specific signal necessary for recording to the TDM signal; element 7 is a recording processing circuit for converting the TDM signal from the signal addition circuit 6 to a recordable signal suited to recording; element 8a is a recording head for recording the recordable signal on a magnetic tape 9; element 8b is a reproducing head for reproducing the recorded signal from the magnetic tape 9; element 10 is a reproduction processing circuit for processing the reproduced signal from the head 8b to obtain a TDM signal; element 11 is a de-emphasis circuit composed of a digital filter capable of stopping its de-emphasis processing operation on the time axis; element 12 is an effective period detecting circuit for detecting an effective period of the reproduced TDM signal; element 13 is a TDM decoding circuit for separating the TDM signal into the luminance signal and chrominance signal; element 14 is a synchronous signal addition circuit for adding a synchronous signal to each of the reproduced luminance and chrominance signals; element 15 is a luminance signal output terminal, and element 16 is a chrominance signal output terminal. Incidentally, the recording head 8a and reproducing head 8b may be one head used for both recording and reproducing.

When recording, luminance and chrominance signals of a colorless and black level video signal, for example, as shown in waveform diagrams a and b in FIG. 2 are fed to the luminance signal input terminal 1 and chrominance signal input terminal 2, respectively. Here, t4 is an effective period of the luminance signal, and t2 is an effective period of the chrominance signal. The luminance signal and chrominance signal are compressed and multiplexed on the time axis in the TDM encoding circuit 3 to be a TDM signal c in FIG. 2. Here, t1 is a synchronous signal period, t2 is an effective period of the chrominance signal, t3 is a Y/C guard period, and t4 is an effective period of the luminance signal. Usually black level signals are inserted in t1 and t3. The effective period detecting circuit 5, detects the effective periods t2 and t4 of the TDM signal, and controls the emphasis circuit 4 so as to stop the emphasis processing operation on the time axis in other periods. The output signal of the emphasis circuit 4 is as shown in waveform diagramed in FIG. 2, in which all impulse responses of the signals in the effective periods t2 and t4 are included in the effective periods t2 and t4. The output signal of the emphasis circuit 4 is then added by the signal addition circuit 6 to a synchronous signal in t1 and a Y/C guard signal in t3 to become a waveform e in FIG. 2. The resultant signal is converted into a signal suited to recording in the recording processing circuit 7, and recorded on the magnetic tape 9 by the recording head 8a.

When reproducing, the signal reproduced by the reproducing head 8b from the magnetic tape 9 is converted into a reproduced TDM signal by the reproduction processing circuit 10. The reproduced TDM signal is subjected to a de-emphasis processing in the de-emphasis circuit 11. Here, the effective period detecting circuit 12 detects the effective periods t2 and t4 and controls the de-emphasis circuit 11 so as to stop its de-emphasis processing operation on the time axis in the remaining periods t1 and t3. Therefore, the parts in the effective periods t2 and t4 of the output signal of the de-emphasis circuit 11 are perfectly reproduced as shown in the waveform f in FIG. 2. In the TDM decoding circuit 13, the luminance signal in the effective period t4 and the chrominance signal in the effective period t2 are separated from the TDM signal f in FIG. 2, and time-expanded. Then, a synchronous signal is added to each of the luminance and chrominance signals in the synchronous signal addition circuit 14 to obtain a luminance signal g shown in FIG. 2 at the luminance signal output terminal 15 and a chrominance signal h shown in FIG. 2 at the chrominance signal output terminal 16.

To stop the time axis of the emphasis circuit and de-emphasis circuit, the basic clock supplied to the digital filter, may be stopped.

Figure 3:
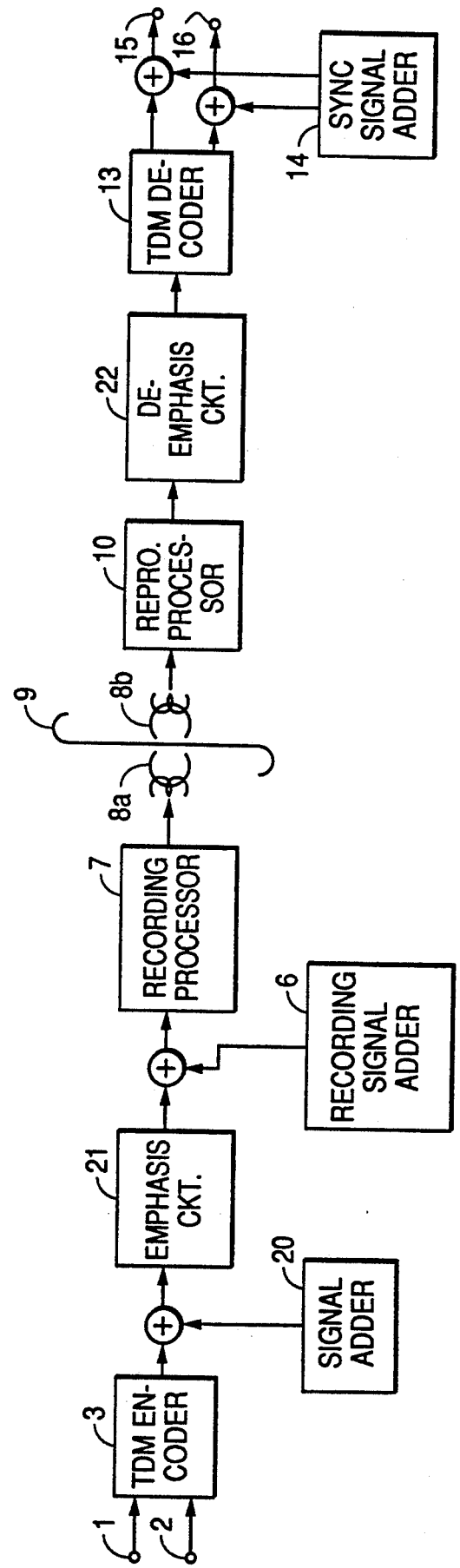
FIG. 3 is a block diagram showing a video signal recording and reproducing apparatus in accordance with a second embodiment of the present invention.
Figure 4:
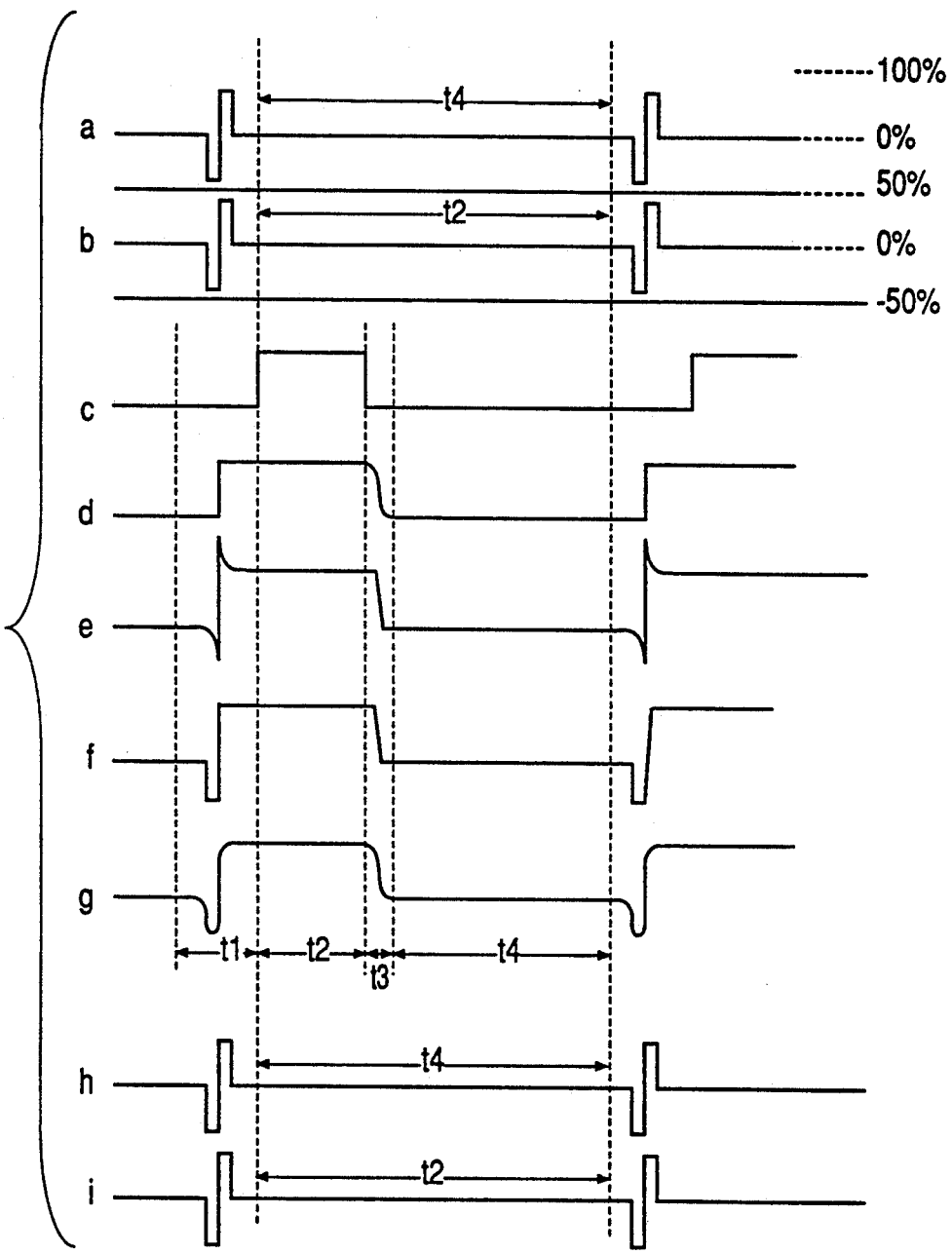
FIGS. 4a-4i are waveform diagram for explaining an operation of the second embodiment.
Figure 5:
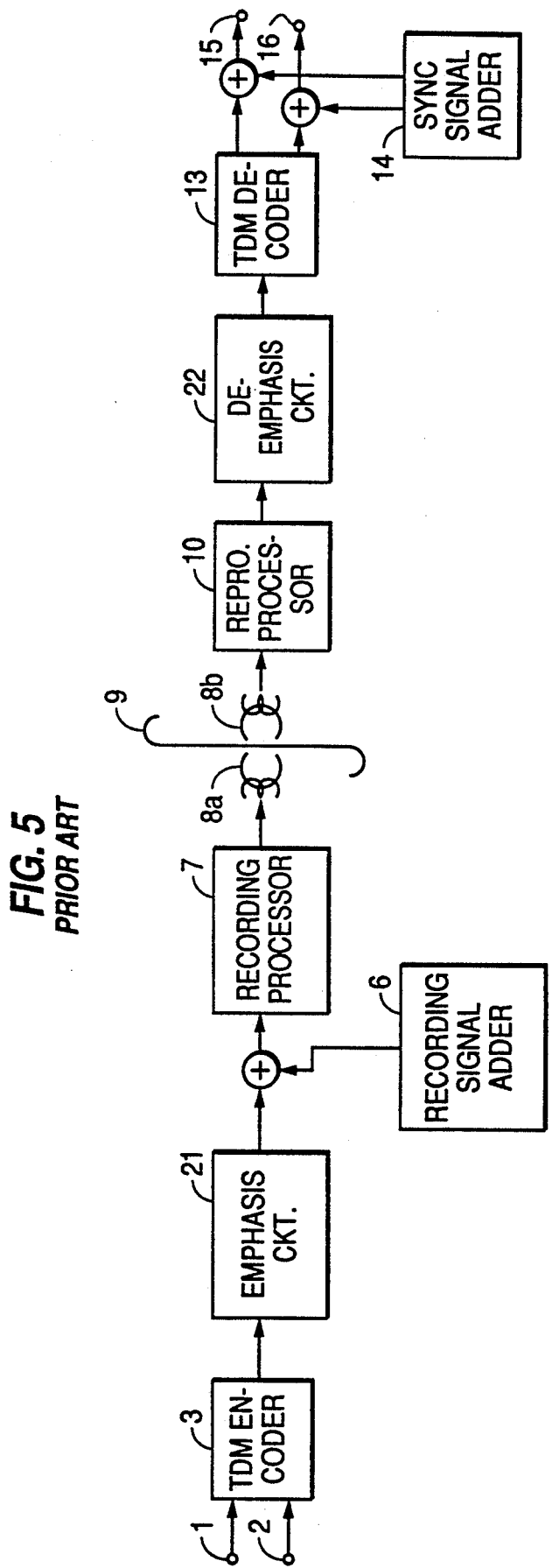
FIG. 5 is a block diagram showing a conventional video signal recording and reproducing apparatus.
Figure 6:
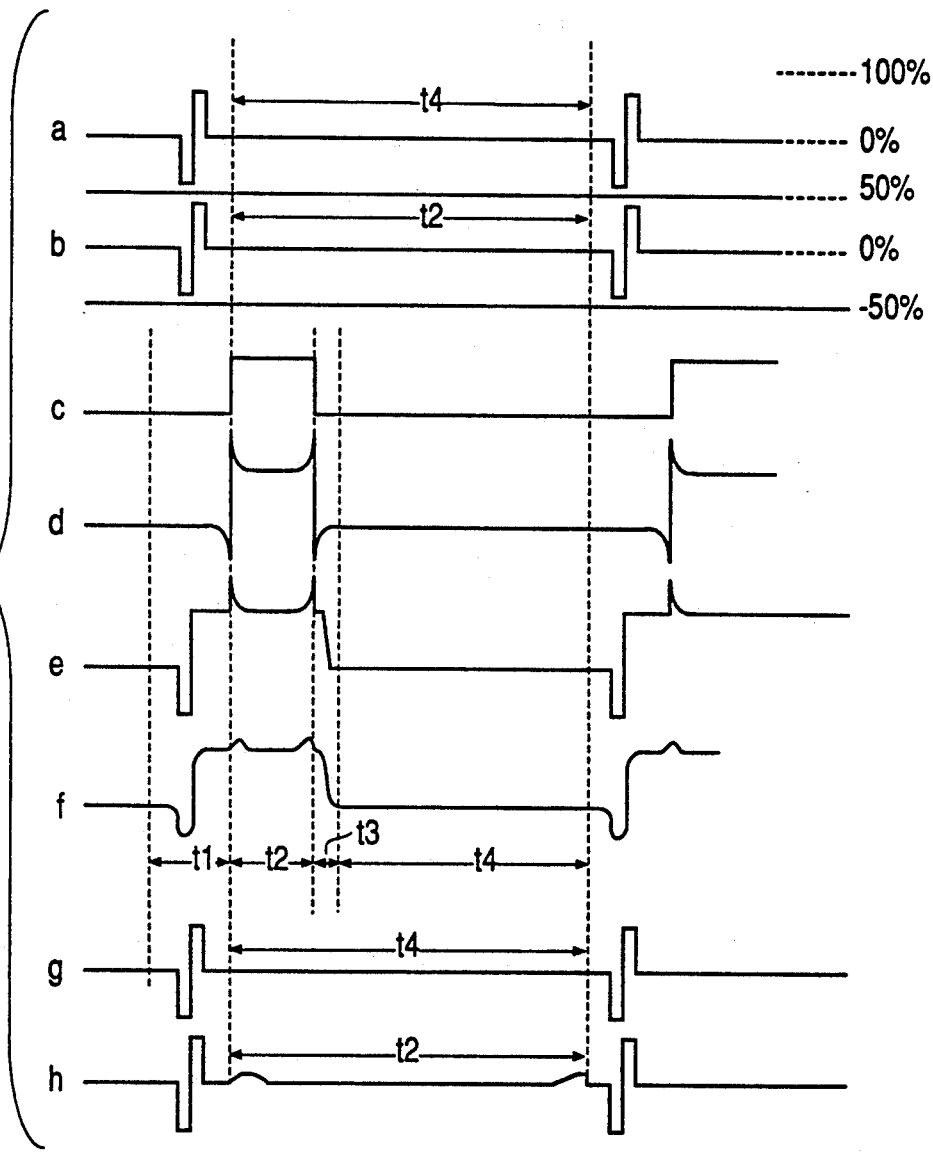
FIGS. 6a-6h are waveform diagram for explaining an operation of the conventional apparatus.

FIG. 3 is a block diagram of a video signal recording and reproducing apparatus in accordance with the second embodiment of the present invention. FIG. 4 is a waveform diagram showing signal waveforms for explaining an operation of the video signal recording and reproducing apparatus in FIG. 3. In FIG. 3, element 20 is a signal addition circuit; element 21 is an emphasis circuit element 22 is a de-emphasis circuit, and the other structural elements are the same as those in the first embodiment.

When recording, luminance and chrominance signals of a colorless and black level video signal, for example, as shown in waveform diagrams a and b in FIG. 4 are fed to the luminance signal input terminal 1 and chrominance signal input terminal 2, respectively. Here, t4 is the effective period of the luminance signal, and t2 is the effective period of the chrominance signal. The luminance signal and chrominance signal are compressed and multiplexed on the time axis in the TDM encoding circuit 3 to be a TDM signal having a waveform c in FIG. 4. Here, t1 is the synchronous signal period, t2 is the effective period of the chrominance signal, t3 is the Y/C guard period, and t4 is the effective period of the luminance signal, wherein usually black level signals are inserted in t1 and t3. In the signal addition circuit 20, specific signals (described later).as shown by a waveform d in FIG. 4 are added to the TDM signal in the synchronous signal period t1 and Y/C guard period t3. The output signal of the emphasis circuit 21 becomes a TDM signal having a waveform e shown in FIG. 4 increased in level in the medium and high frequency regions. The output signal of the emphasis circuit 21 is then added with to a synchronous signal in t1 and a Y/C guard signal in t3 to be a waveform f in FIG. 4. This signal is converted into a signal suited to recording in the recording processing circuit 7, and is recorded on the magnetic recording tape 9 by the recording head 8a.

When reproducing, the signal reproduced from the magnetic tape 9 by the reproducing head 8b is converted into a reproduced TDM signal by the reproduction processing circuit 10. The reproduced TDM signal is fed to the de-emphasis circuit 22, and de-emphasized into a waveform g in FIG. 4 decreased in level in the medium and high frequency regions. In the TDM decoding circuit 13, the luminance signal in the effective period t4 and the chrominance signal in the effective period t2 are separated from the TDM signal g in FIG. 4, and time-expanded. Thereafter, a synchronous signal is added to each of the luminance and chrominance signals in the synchronous signal addition circuit 14 to obtain a luminance signal h as shown in FIG. 4 at the luminance signal output terminal 15 and a chrominance signal i as shown in FIG. 4 at the chrominance signal output terminal 16.

Here, the specific signal to be added prior to the emphasis processing may be properly selected such that the waveform deterioration after the de-emphasis will be decreased. As shown in FIG. 4d, in the synchronous signal period t1, which is sufficiently longer than the period of impulse response caused by the emphasis processing, a black level signal may be added during a longer period than the impulse response period from the trailing end of the luminance signal, and a colorless level signal may be added during a longer period than the impulse response period to the leading end of the chrominance signal. On the other hand, a signal which becomes a predetermined Y/C guard signal by the emphasis processing may be added in the Y/C guard signal period t3, which is shorter than the period of the impulse response of the emphasis processing. After the emphasis processing, even if an additional specific signal necessary for recording is added to the TDM signal as shown in the waveform f in FIG. 4, the TDM signal is not affected at the end portions of the chrominance signal effective period t2 and luminance signal effective period t4 by the emphasis and signal addition. Therefore, the video signal obtained after being de-emphasized during reproducing will not have a deteriorated waveform in the end portions of the effective period t2 of the chrominance signal and the effective period t4 of the luminance signal as shown in FIG. 4g.

In the foregoing embodiments, the emphasis circuit is the phase linear type, but the same effects can be obtained in the case of the phase nonlinear type.

What is claimed is:

1. A video signal recording and reproducing apparatus comprising:
a first signal adding means for adding a first specific signal in a synchronous signal period and a luminance/chrominance guard period of an input video signal, the input video signal having the synchronous signal period in which a synchronous signal is present, a first effective period in which a time-compressed chrominance signal is present, a second effective period in which a time-compressed luminance signal is present and the luminance/-chrominance guard period between the first effective period and the second effective period;
an emphasis means for emphasizing an output video signal from said first signal adding means to obtain an emphasized video signal, said emphasized video signal having an impulse response period;

a second signal adding means for adding a second specific signal necessary for recording the video signal to the emphasized video signal in the synchronous signal period and the luminance/chrominance guard period to obtain a recordable video signal;

a recording and reproducing means for recording the recordable video signal on a recording medium and for reproducing the recorded video signal from the recording medium to obtain a reproduced emphasized video signal; and a de-emphasis means for de-emphasizing the reproduced emphasized video signal to obtain a reproduced video signal;

wherein the first specific signal is, in the synchronous signal period, a black level signal which has a longer period than the impulse response period from a trailing end of the luminance signal and a colorless level signal which has a longer period than the impulse response period to a leading end of the chrominance signal, and is, in the luminance/chrominance guard period, a signal which becomes a predetermined luminance/chrominance guard signal after the second specific signal is added.

2. A video signal recording and reproducing apparatus comprising:

a time-division multiplexing means for time-compressing and time-division multiplexing input luminance and chrominance signals of a video signal to obtain a time-division multiplexed signal which has a synchronous signal period in which a synchronous signal is present, a first effective period in which a time-compressed chrominance signal is present, a second effective period in which a time-compressed luminance signal is present, and a luminance/chrominance guard period between the first effective period and the second effective period;

a first signal adding means for adding a first specific signal to the time-division multiplexed signal in the synchronous signal period and the luminance/chrominance guard period;

an emphasis means for emphasizing an output signal from said first signal adding means to obtain an emphasized signal, said emphasized signal having an impulse response period;

a second signal adding means for adding a second specific signal necessary for recording the emphasized signal to the emphasized signal in the synchronous signal period and the luminance/chrominance guard period;

a recording signal processing means for processing an output signal from said second signal adding means to obtain a recordable signal;

a recording and reproducing means for recording the recordable signal on a recording medium and for reproducing the recorded signal from the recording medium;

a reproduced signal processing means for processing a reproduced signal from said recording and reproducing means to obtain a reproduced emphasized signal;

a de-emphasis means for de-emphasizing the reproduced emphasized signal to obtain a reproduced time-division multiplexed signal; and a time-division de-multiplexing means for de-multiplexing the reproduced time-division multiplexed signal to obtain reproduced luminance and chrominance signals;

wherein the first specific signal is, in the synchronous signal period, a black level signal which has a longer period than the impulse response period from a trailing end of the luminance signal and a colorless level signal which has a longer period than the impulse response period to a leading end of the chrominance signal, and is, in the luminance/chrominance guard period, a signal which becomes a predetermined luminance/chrominance guard signal after the second specific signal is added.

* * * * *